3,468,956
PREPARATION OF DIALKYL KETONES
Theodore C. Mead, Glenham, N.Y., assignor to Texaco Inc., New York, N.Y., a corporation of Delaware
No Drawing. Filed May 11, 1965, Ser. No. 454,984
Int. Cl. C07c 49/06
U.S. Cl. 260—595    4 Claims

ABSTRACT OF THE DISCLOSURE

A method of producing dialkyl ketone comprising contacting alkanoic acid with polyphosphoric acid.

---

This invention pertains to a method of catalytically preparing dialkyl ketones. More specifically, it relates to a method of producing dialkyl ketone from an alkanoic acid utilizing polyphosphoric acid as a combination catalyst and reaction solvent.

In the past, dialkyl ketones were successfully prepared by passing alkanoic acid in the gaseous state over manganese oxide, thoria or zirconia at elevated temperatures. Although the prior art method produced nearly quantitative yields, it has the disadvantage of not being able to prepare the relatively high molecular weight dialkyl ketones without serious reactant and/or product degradation due to the extreme temperatures required to place the high molecular weight carboxylic acid reactant in the gaseous state.

I have discovered and this constitutes my invention, a liquid phase reaction for the conversion of alkanoic acids into the corresponding dialkyl ketones conducted at moderate temperatures. More particularly, my invention comprises forming dialkyl ketones of the general formula:

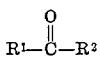

where $R^1$ and $R^2$ are the same or different monovalent saturated aliphatic hydrocarbon radicals (alkyl) of from 3 to 30 carbons by heating a mixture of at least one alkanoic acid of the general formula:

R—COOH where R is an alkyl of from 3 to 30 carbons, and polyphosphoric acid (PPA) in a weight ratio of polyphosphoric acid to alkanoic acid of between about 1:1 and 10:1, preferably between about 2:1 and 5:1, at a temperature of between about 100 and 300° C., preferably between 125 and 200° C., advantageously for a period of time between 0.5 and 10 hours. Under advantageous conditions the reaction mixture is maintained in a state of agitation during heating and additional diluent is not employed. The formed dialkyl ketone product is recovered from the final reaction mixture by standard means, e.g., selective extraction, recrystallization, distillation and combinations thereof.

It is theorized that the method of invention proceeds in accordance with the following equation:

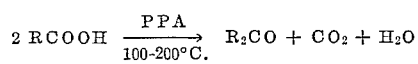

Within the definition of "alkanoic acid" mixtures of alkanoic acids are intended as well as individual members thereof.

Examples of the alkanoic acids contemplated herein are heptanoic, octanoic, decanoic, stearic, tetracosanoic, 2-methyl propanoic, 3,3-dimethyl butanoic, 4-methyl pentanoic acids and mixtures thereof.

The polyphosphoric acid employed as the catalytic solvent in the method of the invention is a viscous liquid of phosphorus acids comprising about 55 wt. percent tripolyphosphoric acid ($H_5P_3O_{10}$), the remainder of the acids being other polyphosphoric acids and orthophosphoric acid ($H_3PO_4$). On analysis polyphosphoric acid has a 82–85 wt. percent $P_2O_5$ content. It is prepared by heating orthophosphoric acid with sufficient amount of phosphorus pentoxide at elevated temperature to give a product having 82–85 wt. percent $P_2O_5$ content on analysis. A typical method of preparation comprises adding 150–210 grams of $P_2O_5$ with stirring and under cooling conditions to 100 ccs. of orthophosphoric acid and heating the resultant mixture in a boiling water bath for several hours to form the polyphosphoric acid product. Polyphosphoric acid is further defined in the art in Bell, "Industrial Engineering Chemistry" 40, 1464 (1946); Van Wazer, Holst, "J. Am. Chem. Soc." 72, 639 (1950) and "The Merck Index," p. 833, 7th Ed. (1960).

There are several critical features in the process of the invention. In the first place, reactant is critical. If materials closely related to the contemplated alkanoic acids are substituted for the organic acid reactant such as dibasic, aromatic and cycloalkane carboxylic acids, no corresponding dihydrocarbyl ketones are formed. Either no reaction occurs or a non-ketonic compound is produced.

Secondly, the presence of polyphosphoric acid is essential. If polyphosphoric acid is omitted from the reaction or another mineral acid is substituted therefor such as hydrochloric acid and sulfuric acid, no dialkyl ketone is formed.

Still another essential aspect of the method of the invention is in respect to the amount of polyphosphoric acid employed. If the weight ratio of polyphosphoric acid falls below about 0.5:1, no discernible amount of dialkyl ketone is produced.

Still further, many of the standard diluents of the art are not desirable components in the method of the invention such as benzene, in that they either prevent the reaction or direct the reaction to the production of other products.

The following examples further illustrate the method of invention but are not to be interpreted as limitations thereof. The polyphosphoric acid employed therein has a $P_2O_5$ content of 85 wt. percent.

EXAMPLE I

This example illustrates the preparation of dihexyl ketone from n-heptanoic acid.

A mixture of n-heptanoic acid (118 g.) and polyphosphoric acid (500 g.) was heated with stirring at 200° C. for 3.5 hours. A steady evolution of carbon dioxide was observed during this time. The product solution was poured into 500 g. of cracked ice and stirred for 30 minutes. The resultant two phase system was separated and the aqueous portion washed with two 100 mls. portions of benzene. The benzene washings were combined and added to the organic layer. The organic solution was washed with four 250 mls. portions of 5 wt. percent aqueous NaOH and the benzene removed under water aspirator vacuum to yield a 53.4 g. residue of di-n-hexyl ketone (B.P. 100–110° C.; 80 percent yield based on unrecovered acid).

Analysis of the product: Calc. for dihexyl ketone in wt. percent C=77.4; H=13.1. Found, C=78.7; H=13.2. M.P. 28° C. (after distillation). Infrared carbonyl absorption band=1715 cm.$^{-1}$. M.W., calc.=198; found =195 (osmometer method). Mass spectral and N.M.R. (nuclear magnetic resonance) analyses supported the assigned structure.

EXAMPLE II

This example illustrates the preparation of diheptyl ketone from n-octanoic acid.

A mixture of n-octanoic acid (144.2 g.) and polyphosphoric acid (500 g.) was heated with stirring to 170° C. for 6 hours. The originally clear solution became light yellow, then an increasingly dark brown. A moderate evolution of carbon dioxide was observed throughout. The solution was poured into 500 mls. of deionized water and was stirred overnight. The aqueous layer was separated and washed with two 200 mls. portions of benzene. The benzene washings were added to the organic phase and the aggregate washed with four 200 mls. portions of 5 wt. percent NaOH. Vacuum stripping of the solvent afforded 24.6 g. of residue which was fractionally distilled and 9.4 g. of diheptyl ketone (B.P. 165° C. at 9 mm. Hg; recrystallized from ethanol, M.P. 38.5–39° C.) were recovered.

EXAMPLE III

This example illustrates the preparation of dinonyl ketone from n-decanoic acid.

A mixture of n-decanoic acid (172 g.) and polyphosphoric acid (500 g.) was heated for three hours at temperatures gradually increasing from 160 to 225° C. A slight evolution of carbon dioxide was observed. The dark brown reaction mixture was poured into 500 mls. of cold, deionized water and the resultant two phases separated. The aqueous phase was washed with two 200 mls. portions of benzene, and the benzene washings added to the organic material. The combined organic layers were washed with 1000 mls. of 5 wt. percent aqueous sodium hydroxide solution in three portions. Benzene was removed on a rotary evaporator under water aspirator vacuum to leave 70.5 g. of a residue which was insoluble in 10 wt. percent sodium carbonate solution. The residue was distilled under oil pump vacuum with considerable decomposition. Between 132–145° C. at 0.25–0.43 mm. Hg there was collected 13.5 g. of dinonyl ketone which when recrystallized once from ethanol had a melting point of 54–55° C.

EXAMPLE IV

This example illustrates the criticality of polyphosphoric acid (PPA) catalyst.

In Run A no catalyst was employed. In Run B sulfuric acid replaced polyphosphoric acid as catalyst and in Run C hydrochloric acid was employed as the cocatalyst with polyphosphoric acid. All the runs employed n-decanoic acid. The particular run conditions and results are reported below in Table I:

TABLE I

| Reaction conditions and product | Run A | Run B | Run C |
|---|---|---|---|
| Decanoic acid, g | 100 | 86 | 40 |
| $H_2SO_4$, g | | 500 | |
| HCl, g | | | 15¹ |
| PPA, g | | | 125 |
| Reaction time, hrs | 3 | 1.5 | 3 |
| Reaction temp., ° C | 150 | 140 | 130 |
| Dinonyl ketone product, g | 0 | 0 | 0 |

¹ Saturated reaction mixture.

EXAMPLE V

This example illustrates the criticality in the amounts of polyphosphoric acid catalyst employed.

To 86 grams of decanoic acid there was added 5 grams of polyphosphoric acid and the reaction mixture was stirred for three hours at 130° C. Analysis of the product found that no reaction occurred. The procedure was again repeated except 5 grams of polyphosphoric acid were added to 72 grams of octanoic acid and the resultant mixture was stirred for 4 hours at 190° C. At the end of the 4 hour period analysis of the reaction mixture found that no reaction occurred.

EXAMPLE VI

This example demonstrates the criticality of the alkanoic reaction in the formation of dialkyl ketones.

In the method of the invention adipic acid, benzoic acid, mixtures of benzoic and isobutyric acid, sebacic acid, mixtures of p-nitrobenzoic acid and isobutyric acid were substituted for the contemplated alkanoic acid reactant. These reactants produced no corresponding dihydrocarbon ketones. The particular conditions and results are reported below in Table II:

TABLE II

| Run | Reactant | React., g. | PPA, g. | React. temp., ° C. | React. time, hrs. | Product |
|---|---|---|---|---|---|---|
| A | Cyclohexane carboxylic acid. | 128 | 500 | 125 | 5.5 | No ketone. |
| B | Adipic acid | 146 | 500 | 140 | 2.0 | Undefined polymer. |
| C | Benzoic acid | 124 | 500 | 200 | 1.8 | No reaction. |
| D | Benzoic acid+isobutyric acid. | 120 / 30 | 500 | 140 | 3.0 | No isobutyrophenone. |
| E | Sebacic acid | 101 | 500 | 152 | 4.0 | Undefined polymer. |
| F | p-Nitrobenzoic+isobutyric. | 167 / 88 | 500 | 125 | 3.0 | Undefined product. |

EXAMPLE VII

This example illustrates the desirability in the method of the invention of the absence of added diluent.

The method of the invention was conducted in the presence of benzene and dimethyl sulfoxide. The reaction data and results are reported below in Table III:

| Reaction conditions and product | Run G | Run H |
|---|---|---|
| Decanoic acid, g | 86 | 25 |
| PPA, g | 100 | 52 |
| Benzene, g | 320 | |
| Dimethyl sulfoxide, g | | 163 |
| React. temp., ° C | 80 | 125 |
| React. time, hrs | 2 | 3.3 |
| Dinonyl ketone, g | 0 | 0 |

I claim:

1. A method of producing a dialkyl ketone of the formula:

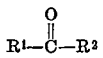

where $R^1$ and $R^2$ are alkyl of from 3 to 30 carbons comprising contacting at least one alkanoic acid of the formula:

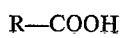

where R is alkyl of from 3 to 30 carbons with polyphosphoric acid containing about 55 wt. percent tripolyphosphoric acid and having a phosphorus-oxygen content in terms of $P_2O_5$ of from 82 to 85 wt. percent in a weight ratio of said alkanoic acid to said polyphosphoric acid of between about 1:1 and 1:10 at a temperature between about 100 and 300° C.

2. A method in accordance with claim 1 wherein said dialkyl ketone is dihexyl ketone and said alkanoic acid is heptanoic acid.

3. A method in accordance with claim 1 where said dialkyl ketone is diheptyl ketone and said alkanoic acid is octanoic acid.

4. A method in accordance with claim 1 wherein said dialkyl ketone is dinonyl ketone and said alkanoic acid is decanoic acid.

References Cited

Kipping (I) J. Chem. Soc., Transactions vol. 57 pp. 532 and 533 (1890).

Kipping (II) J. Chem. Soc., Transactions vol. 63 pp. 452 and 453 (1893).

Moeller Inorg. Chem. pp. 646 and 647 (1952).

LEON ZITVER, Primary Examiner

M. M. JACOB, Assistant Examiner